US012586725B2

(12) United States Patent
Inakura et al.

(10) Patent No.: US 12,586,725 B2
(45) Date of Patent: Mar. 24, 2026

(54) CAPACITOR HAVING AN EXTERNAL ELECTRODE WITH INCREASED POROSITY

(71) Applicants:Murata Manufacturing Co., Ltd., Nagaokakyo (JP); SHIZUKI ELECTRIC CO., INC., Nishinomiya (JP)

(72) Inventors: Tomoki Inakura, Nagaokakyo (JP); Yoshiyuki Hiragami, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 84 days.

(21) Appl. No.: 18/606,126

(22) Filed: Mar. 15, 2024

(65) Prior Publication Data

US 2024/0222024 A1      Jul. 4, 2024

Related U.S. Application Data

(63) Continuation of application No. PCT/JP2022/033431, filed on Sep. 6, 2022.

(30) Foreign Application Priority Data

Sep. 27, 2021      (JP) ................................. 2021-156866

(51) Int. Cl.
*H01G 4/228* (2006.01)
*H01G 4/008* (2006.01)
*H01G 4/012* (2006.01)
*H01G 4/32* (2006.01)

(52) U.S. Cl.
CPC ............. *H01G 4/228* (2013.01); *H01G 4/008* (2013.01); *H01G 4/012* (2013.01); *H01G 4/32* (2013.01)

(58) Field of Classification Search
CPC ........ H01G 4/232; H01G 4/2325; H01G 4/32; H01G 4/012; H01G 4/008; H01G 4/228
See application file for complete search history.

(56) References Cited

U.S. PATENT DOCUMENTS

| | | | |
|---|---|---|---|
| 8,098,479 B1 * | 1/2012 | Parler, Jr. ................. | H01G 4/32 |
| | | | 361/308.1 |
| 11,430,610 B2 | 8/2022 | Jogan et al. | |
| 2020/0273624 A1 * | 8/2020 | Jogan ....................... | H01G 4/33 |
| 2022/0130611 A1 * | 4/2022 | Jogan ....................... | H01G 4/32 |

FOREIGN PATENT DOCUMENTS

| | | |
|---|---|---|
| JP | 2008166457 A | 7/2008 |
| WO | 2019097753 A1 | 5/2019 |

OTHER PUBLICATIONS

International Search Report issued in PCT/JP2022/033431, mailing date Nov. 15, 2022.

* cited by examiner

*Primary Examiner* — David M Sinclair
(74) *Attorney, Agent, or Firm* — ArentFox Schiff LLP

(57) ABSTRACT

A capacitor that includes: a capacitor element; an external electrode on an end face of the capacitor element; and a lead terminal bonded to the external electrode, wherein the external electrode has a porosity of 8% to 20%. The external electrode may be a metallikon electrode. The external electrode may also contain an alloy of zinc and aluminum.

17 Claims, 4 Drawing Sheets

10

<u>10</u>

CAPACITOR HAVING AN EXTERNAL ELECTRODE WITH INCREASED POROSITY

CROSS REFERENCE TO RELATED APPLICATIONS

The present application is a continuation of International application No. PCT/JP2022/033431, filed Sep. 6, 2022, which claims priority to Japanese Patent Application No. 2021-156866, filed Sep. 27, 2021, the entire contents of each of which are incorporated herein by reference.

TECHNICAL FIELD

The present invention relates to a capacitor.

BACKGROUND ART

In a capacitor, the reliability of electrical connection between an external electrode that leads an electrode of a capacitor element to the outside and a lead terminal bonded to the external electrode is an important factor. Patent Document 1 discloses to form projections and recesses on a bonding surface of a lead terminal to a metallikon electrode. According to Patent Document 1, the lead terminal is thereby reliably connected and fixed to the metallikon electrode.

Patent Document 1: JP-A-2008-166457

SUMMARY OF THE INVENTION

In order to ensure connection and fixation to the metallikon electrode by the method of Patent Document 1, it is necessary to enlarge the projections and recesses to be formed on the lead terminal. Deep recesses formed in the lead terminal reduce the mechanical strength of the lead terminal and cause it to break. That is, contrary to the purpose, the reliability of connection is reduced. Depending on the material of the metallikon electrode, the effect of improving connection or the like may not be observed even when projections and recesses are formed on the lead terminal.

An object of the present invention is to provide a capacitor having high connection reliability between an external electrode and a lead terminal.

The present invention relates to a capacitor that includes: a capacitor element; an external electrode on an end face of the capacitor element; and a lead terminal bonded to the external electrode, wherein the external electrode has a porosity of 8% to 20%. Thereby, the bonding between the external electrode and the lead terminal is strengthened, so that the connection reliability is improved.

The porosity of the external electrode is preferably 10% to 20%. This makes the bonding between the external electrode and the lead terminal stronger.

The external electrode is, for example, a metallikon electrode. The porosity of the metallikon electrode is easily controlled.

The external electrode may include an alloy of zinc and aluminum.

The capacitor element includes an internal electrode, and the internal electrode comprises, for example, a metallized film. The metallized film includes, for example, a resin film and a metal layer formed on at least one main surface of the resin film. That is, the capacitor of the present invention may be a film capacitor.

The present invention provides a capacitor having high connection reliability between an external electrode and a lead terminal.

DETAILED DESCRIPTION OF THE PREFERRED EMBODIMENTS

Figure 1:
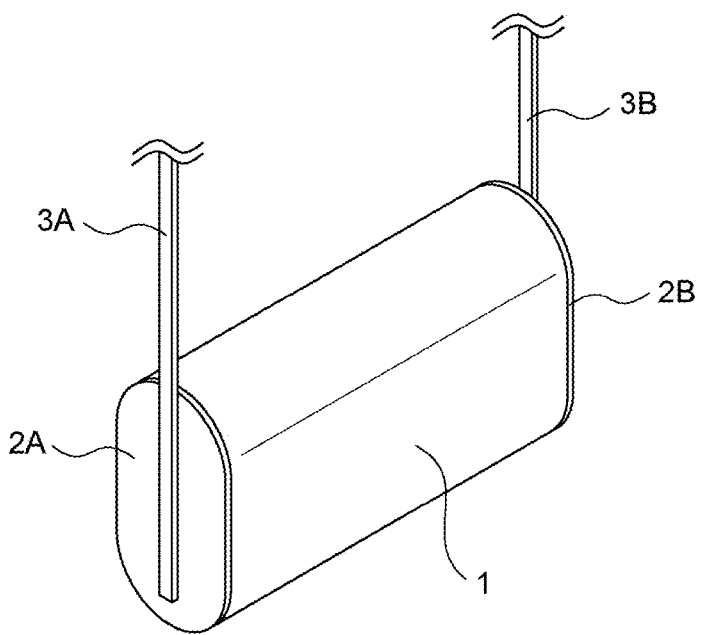
FIG. 1 is a perspective view schematically illustrating a capacitor according to one embodiment of the present invention.

Conventionally, an external electrode provided on an end face of a capacitor element has a dense structure for the purpose of reducing a resistance value and reducing moisture permeability. A dense external electrode has high hardness. Therefore, adhesion between an external electrode and a lead terminal is low, and bonding strength tends to be low. The present inventors have reduced the hardness of an external electrode while also improving the adhesion between a lead terminal and the external electrode. By this method, it is not necessary to subject the lead terminal to formation of projections and recesses, so that the mechanical strength is not reduced.

The hardness of the external electrode is affected by porosity, and the larger the porosity, the lower the hardness. This tendency is observed regardless of the material of the external electrode. In the present disclosure, the porosity of the external electrode is controlled to reduce the hardness of the external electrode. The porosity of conventional external electrodes is about 5% (approximately 4.5% to 6%). The porosity of the external electrode in the present disclosure is 8% or more. As a result, the hardness of the external electrode is sufficiently reduced. Therefore, when the lead terminal is bonded to the external electrode, a part of the lead terminal is easily embedded in the external electrode, and a contact area between the lead terminal and the external electrode increases. The increase in the contact area improves adhesion and bonding strength, and also makes the electrical connection more secure. Furthermore, variations in adhesion among products are inhibited, so that the yield is improved.

On the other hand, the porosity of the external electrode is set to 20% or less in consideration of the electrical resistance of the external electrode. Porosity in excess of 20% decreases conductive paths and greatly increases electrical resistance. Therefore, the performance as an electrode is deteriorated. In addition, since the contact area with the lead terminal is reduced, the adhesion is rather deteriorated.

The porosity of the external electrode is between 8% and 20% to obtain a capacitor with high bonding strength and superior connection reliability without impairing the performance as an electrode. The capacitor according to the present disclosure has good electrical characteristics (for example, ESR characteristics).

The porosity of the external electrode is calculated as follows.

First, the capacitor is cut to expose a section of the external electrode. The section is observed with a scanning electron microscope (SEM) at a 300× magnification, and binarized such that void portions are black and the other portions are white. Next, a measurement range having a sectional area of 0.05 mm$^2$ or more is determined in the observation field. The measurement range is determined such that portions other than the section of the external electrode, such as a background, are not included. The proportion of the black portions in this measurement range is calculated. This operation is performed for the sections of at least four other positions of the external electrode. The average value of the five or more values obtained is regarded as the porosity of the external electrode. The cutting direction of the capacitor is not limited, and may be either the thickness direction of the external electrode or the direction parallel to an end face of the capacitor element. The measurement range may be 0.3 mm$^2$ or less. The measurement range is desirably 0.07 mm$^2$ to 0.2 mm$^2$.

[Capacitor]

The capacitor according to the present disclosure includes a capacitor element, an external electrode on an end face of the capacitor element, and a lead terminal bonded to the external electrode. The porosity of the external electrode is 8% to 20%.

The capacitor according to the present disclosure is applicable to various applications. The capacitor according to the present disclosure is particularly suitable for use in an environment with a large temperature change. Furthermore, since high connection reliability can be expected over a long term, the capacitor according to the present disclosure is suitably used for electronic devices to be mounted on automobiles and industrial devices, in particular, electric compressors, pumps, and power devices. Examples of the power devices include a charger, a DC-DC converter, and a driving inverter.

The size and shape of the capacitor are not limited, and may be appropriately set according to the capacity, application, and so on. The type of the capacitor is also not limited. The capacitor according to the present disclosure is typically a film capacitor. Hereinafter, the capacitor according to the present disclosure will be described in detail by taking a film capacitor as an example. The capacitor according to the present disclosure is not limited thereto.

(Capacitor Element)

The capacitor element usually includes two types of internal electrodes differing in polarity (hereinafter referred to as first internal electrode and second internal electrode). The capacitor element may be either a laminated type or a wound type. In the laminated capacitor element, the first internal electrode and the second internal electrode are each cut into a prescribed size, and a plurality of the first internal electrodes and a plurality of the second internal electrodes are alternately laminated. In the wound capacitor element, the first internal electrode and the second internal electrode are elongated bodies, are laminated, then wound, and, as necessary, pressed. In this case, a section of the capacitor element may be elliptical (a shape like an athletic field track). The configurations of the first internal electrode and the second internal electrode may be either the same or different.

Each of the internal electrodes comprises for example, a metallized film. The metallized film includes a resin film and a metal layer formed on at least one main surface of the resin film.

The material of the resin film is not limited, and may be either a thermosetting resin or a thermoplastic resin.

Examples of the thermosetting resin include phenol resin, epoxy resin, melamine resin, urea resin, unsaturated polyester resin, silicone resin, urethane resin, and thermosetting polyimide. Examples of the thermoplastic resin include polypropylene, polyethersulfone, polyetherimide, and polyallyl arylate. These are used singly or two or more of them are used in combination. The resin film may further contain an additive such as a leveling agent.

The thickness of the resin film may be 5 μm or less, may be 3.5 μm or less, and may be 3.4 μm or less. The thickness of the resin film may be 0.5 μm or more. In one embodiment, the thickness of the resin film is 0.5 μm to 5 μm. The thickness of the resin film can be measured using an optical film thickness gauge.

The metal layer is formed on a part of at least one main surface of the resin film by, for example, a vapor deposition method. Examples of the metal contained in the metal layer include aluminum, zinc, titanium, magnesium, copper, and nickel.

The thickness of the metal layer is not limited. From the viewpoint of inhibiting damage, the thickness of the metal layer is preferably 5 nm or more. The thickness of the metal layer is preferably 40 nm or less. The thickness of the metal layer can be specified by observing a section of the metallized film cut in the thickness direction with an electron microscope such as a field emission scanning electron microscope (FE-SEM).

(External Electrode)

The external electrode is disposed on an end face of the capacitor element. The external electrode is usually disposed on each of the opposite end faces of the capacitor element. For example, in the case of a wound capacitor element, the external electrode is disposed on each of both the end faces in the winding axis direction of the capacitor element. The external electrode may cover an end face of the capacitor element.

The external electrodes are each electrically connected to the internal electrode, and play a role of leading the internal electrode to the outside. One of the external electrodes (a first external electrode) is electrically connected to a first internal electrode. The other external electrode (a second external electrode) is electrically connected to a second internal electrode.

The porosity of the external electrode is 8% to 20%. The porosity of at least one of the external electrodes to which the lead terminal is bonded satisfies the above range. It is preferable that the porosities of all the external electrodes to which the lead terminal is bonded satisfy the above range. The porosities of the external electrodes are preferably 10% or more, and more preferably 11% or more. The porosities of the external electrodes are preferably 19% or less, and more preferably 18% or less. In one embodiment, the external electrodes have a porosity of 10% to 20%.

The external electrode is typically formed of metal. Examples of the metal include zinc, aluminum, tin, and a zinc-aluminum alloy. In the zinc-aluminum alloy, the content of aluminum is, for example, 20 wt % or less, 18 wt % or less, or 15 wt % or less. In the zinc-aluminum alloy, the content of aluminum is, for example, 0.1 wt % or more, 0.5 wt % or more, or 1 wt % or more.

The thickness of the external electrode is not limited. The thickness of the external electrode is, for example, 0.5 mm to 3 mm. The thickness of the external electrode is the length of the external electrode in the normal direction of an end face of the capacitor element. The thickness of the external electrode is an average value of those at a plurality of arbitrary portions (preferably, three or more portions).

The external electrode is formed, for example, by spraying metal on an end face of the capacitor element. Such an external electrode is usually referred to as a metallikon electrode. The metallikon electrode is preferable in that the porosity is easily controlled. The porosity of the metallikon electrode can be controlled by adjusting the blowing pressure of air, the amount of metal sprayed per unit time, the shape of a blowing nozzle, the distance from the tip of the blowing nozzle to the object, and so on. For example, by adjusting the blowing air pressure to more than 0.15 MPa and less than 0.7 MPa, the porosity of the metallikon electrode can be controlled to 8% to 20%. By adjusting the amount of metal sprayed per unit time to more than 20 g/min and less than 140 g/min, the porosity of the metallikon electrode can be controlled to 8% to 20%.

(Lead Terminal)

The lead terminal is bonded and electrically connected to the external electrode. One or more lead terminals are usually bonded to one external electrode. The lead terminal is bonded to the external electrode by welding, for example. In accordance with the present disclosure, adhesion between the lead terminal and the external electrode is improved, so that bonding strength increases.

The position where the lead terminal and the external electrode are bonded is not limited. As described later, when the capacitor element and the external electrode are sealed with resin, the lead terminal is bonded to the external electrode such that a part of the lead terminal is exposed to the outside of the sealing resin.

The material of the lead terminal is not limited as long as it exhibits conductivity. The lead terminal may be, for example, a steel wire or a copper wire, and these wire materials may be subjected to tin plating, zinc plating, copper plating, nickel plating, or the like. The sectional shape of the lead terminal is also not limited, and may be circular, elliptical, or rectangular.

(Sealing Material)

The capacitor element and the external electrode may be sealed with a sealing material. The sealing material can improve water resistance, vibration resistance, and the like. Typical examples of the sealing material include a cured product of a thermosetting resin. Examples of the thermosetting resin include epoxy resin and urethane resin. In this case, the capacitor element and the external electrode are sealed with a cured thermosetting resin. The sealing material may further contain an inorganic filler.

(Capacitor Case)

The capacitor element may be housed in a case. A gap between the capacitor element and the case is filled with a sealing material. This capacitor is produced, for example, as follows. First, a capacitor element including an external electrode is disposed inside the case, and a lead terminal is led out of the case. Thereafter, a thermosetting resin is filled to between the case and the capacitor element and then cured.

FIG. 1 is a perspective view schematically illustrating a capacitor according to the present disclosure. The capacitor 10 includes a capacitor element 1, two external electrodes (first external electrode 2A, second external electrode 2B), and two lead terminals (first lead terminal 3A, second lead terminal 3B). The end faces of the capacitor element 1 have an elliptical shape. The first external electrode 2A is disposed on one end face of the capacitor element 1, and the second external electrode 2B is disposed on the other end face of the capacitor element 1. The first lead terminal 3A is bonded to the first external electrode 2A, and the second lead terminal 3B is bonded to the second external electrode 2B.

EXAMPLES

The present invention will be described hereafter in more detail by way of examples, to which the present invention is not intended to be limited. In the examples, "parts" and "%" are on a mass basis unless otherwise indicated.

Example 1

Aluminum was deposited on a urethane resin film (thickness: 3 μm) to have a thickness of 20 nm, and a metallized film was thereby prepared. Two sheets of this metallized film were laminated and wound to make a capacitor element. Zinc-aluminum alloy (aluminum content: 6%) was sprayed onto both end faces in the winding axis direction of the resulting capacitor element, and two external electrodes (thickness: 1 mm) were thereby formed. Thereafter, a lead terminal (tin-plated copper wire, diameter: 1.2 mm) was resistance-welded to each of the two external electrodes. Thus, 10 film capacitors were obtained.

One of the film capacitors obtained was cut along the winding axis, and a section of each external electrode was thereby exposed. This section was observed with an SEM (S-3400N manufactured by Hitachi High-Technologies Corporation) at a 300× magnification. A measurement range having a sectional area of 0.08 mm$^2$ was determined in the observation field, and the proportion of black portions was calculated. This operation was performed for four other sections of the external electrode and for nine other film capacitors, and the measurements were averaged (the number of the sections measured: 50). The porosity of the external electrode was 10.1%.

Examples 2 to 4, Comparative Examples 1 to 4

10 film capacitors were prepared in the same manner as in Example 1 except that the porosity of the external electrodes was adjusted to the values shown in Table 1 by changing the blowing pressure of air or the amount of metal sprayed per unit time when the external electrodes were formed.

Evaluation

The prepared film capacitors were evaluated as follows. The results are shown in Table 1.

(1) Bonding Strength

Figure 2:
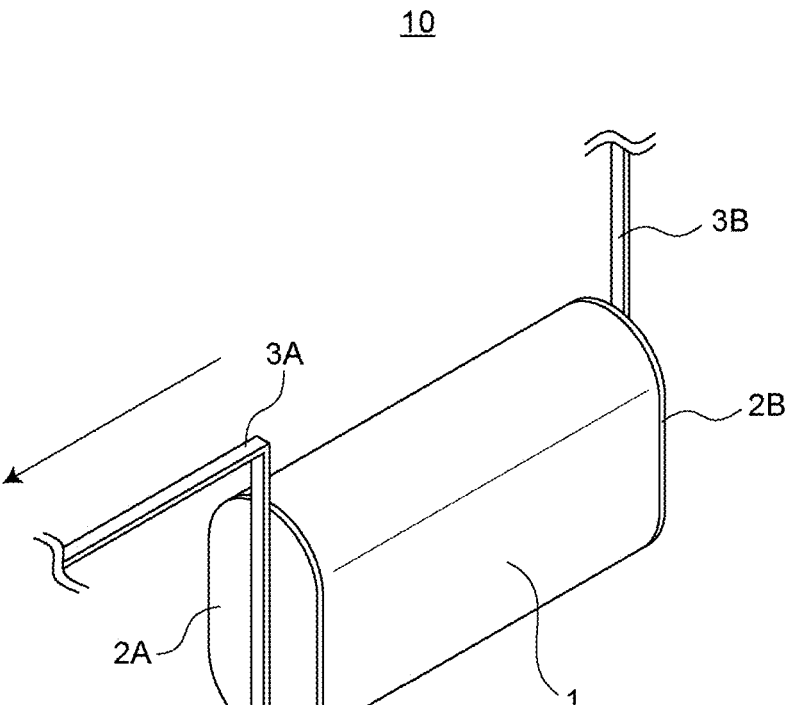
FIG. 2 is a perspective view of a capacitor for explaining a method of measuring bonding strength.

As illustrated in FIG. 2, for each of 10 film capacitors, one lead terminal (in FIG. 2, the first lead terminal 3A) was pulled outward in the winding axis direction, and the tensile strength when the lead terminal was removed from the external electrode was measured using a digital force gauge (ZTA-50N manufactured by IMADA Co., Ltd.). The average value of the tensile strengths was taken as the bonding strength between the lead terminal and the external electrode. When the bonding strength is 7 N or more, desirably 8 N or more, it can be evaluated that sufficient bonding strength is attained.

(2) Resistance Value

The resistance value of each of 10 film capacitors was measured with a resistance meter (RM3545 manufactured by HIOKI E.E. CORPORATION) and the measurements were averaged to determine the resistance value of the film capacitor. Taking the calculated resistance value of the film capacitor of Example 2 as a standard, relative resistance values of other film capacitors were calculated.

TABLE 1

| | Porosity of external electrode (%) | Bonding strength (N) | Relative resistance value |
|---|---|---|---|
| Comparative Example 1 | 3.0 | 3.3 | 0.90 |
| Comparative Example 2 | 4.8 | 5.2 | 0.93 |
| Comparative Example 3 | 7.8 | 6.7 | 0.94 |
| Example 1 | 10.1 | 8.8 | 0.98 |
| Example 2 | 11.2 | 12.1 | 1 |
| Example 3 | 13.2 | 13.5 | 1.01 |
| Example 4 | 17.5 | 17.6 | 1.09 |
| Comparative Example 4 | 21.3 | 17.1 | 1.14 |

In the film capacitors of Examples 1 to 4, the lead terminal and the external electrode are firmly bonded. The film capacitors of Exampled 1 to 4 also have low resistance values.

On the other hand, the film capacitors of Comparative Examples 1 to 3 have small porosities, and are poor in bonding strength. The film capacitor of Comparative Example 4 has a large porosity, and has bonding strength similar to that of Example 4. However, since the porosity is excessively large, the resistance value of the external electrode itself increases, and as a result, the resistance value as a capacitor is large.

Figure 3:
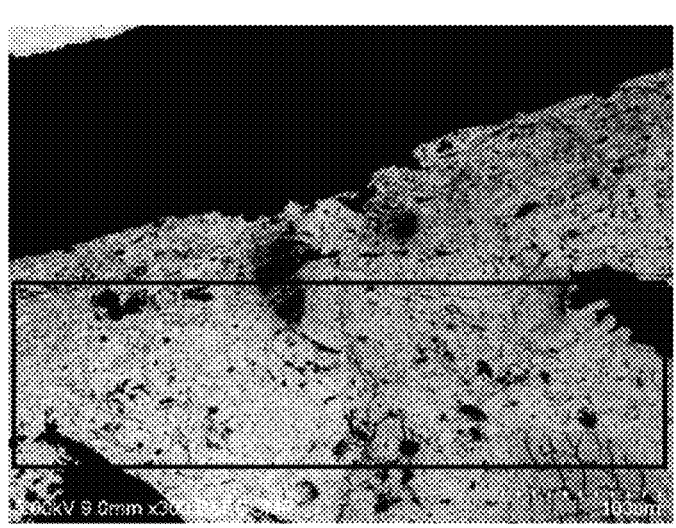
FIG. 3 is an electron microscopic image (300× magnification) of a part of a section of the external electrode of the capacitor prepared in Example 2.
Figure 4:
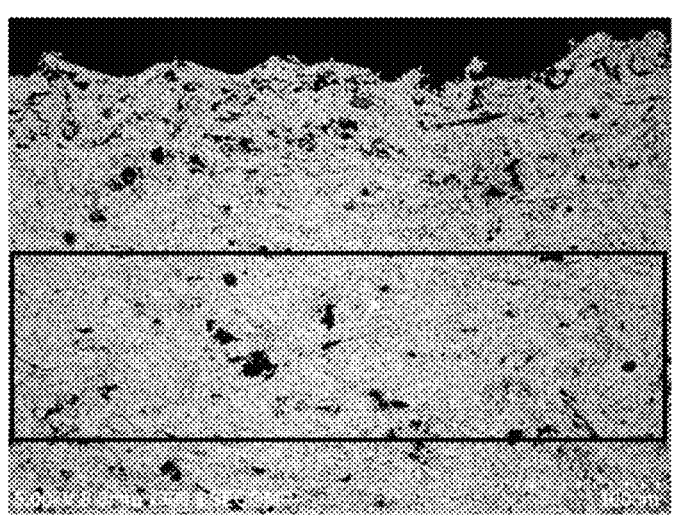
FIG. 4 is an electron microscopic image (300× magnification) of a part of a section of the external electrode of the capacitor prepared in Comparative Example 1.

In FIG. 3 is shown an electron microscopic image (300× magnification) of a part of a section of the external electrode of the capacitor prepared in Example 2. In FIG. 4 is shown an electron microscopic image (300× magnification) of a part of a section of the external electrode of the capacitor prepared in Comparative Example 1. In each of the illustrated examples, the portion surrounded by the rectangle is the measurement range.

The capacitor of the present invention is applicable to various electronic devices because high connection reliability can be expected over a long term.

EXPLANATION OF REFERENCE SYMBOLS

10 Capacitor
1 Capacitor element
2A First external electrode
2B Second external electrode
3A First lead terminal
3B Second lead terminal
The invention claimed is:
1. A capacitor comprising:
a capacitor element;
an external electrode on an end face of the capacitor element; and
a lead terminal bonded to the external electrode,
wherein the external electrode has a porosity of 8% to 20%, and
wherein the lead terminal is made of a steel wire or a copper wire.

2. The capacitor according to claim 1, wherein the porosity of the external electrode is 10% to 20%.

3. The capacitor according to claim 1, wherein the porosity of the external electrode is 10% to 19%.

4. The capacitor according to claim 1, wherein the porosity of the external electrode is 11% to 18%.

5. The capacitor according to claim 1, wherein the external electrode is a metallikon electrode.

6. The capacitor according to claim 1, wherein the external electrode contains an alloy of zinc and aluminum.

7. The capacitor according to claim 1, wherein the external electrode contains zinc, aluminum, tin, or a zinc-aluminum alloy.

8. The capacitor according to claim 1, wherein
the capacitor element includes an internal electrode,
the internal electrode comprises a metallized film, and
the metallized film includes a resin film and a metal layer on at least one main surface of the resin film.

9. The capacitor according to claim 1, wherein the external electrode is a first external electrode, the end face is a first end face, and the lead terminal is a first lead terminal, and the capacitor further comprises:
a second external electrode on a second end face of the capacitor element, the second end face being opposite the first end face; and
a second lead terminal bonded to the second external electrode,
wherein the second external electrode has a porosity of 8% to 20%.

10. The capacitor according to claim 9, wherein the porosity of each of the first external electrode and the second external electrode is 10% to 20%.

11. The capacitor according to claim 9, wherein the porosity of each of the first external electrode and the second external electrode is 10% to 19%.

12. The capacitor according to claim 9, wherein the porosity of each of the first external electrode and the second external electrode 11% to 18%.

13. The capacitor according to claim 9, wherein each of the first external electrode and the second external electrode is a metallikon electrode.

14. The capacitor according to claim 9, wherein each of the first external electrode and the second external electrode contains an alloy of zinc and aluminum.

15. The capacitor according to claim 9, wherein each of the first external electrode and the second external electrode contains zinc, aluminum, tin, or a zinc-aluminum alloy.

16. The capacitor according to claim 9, wherein
the capacitor element includes an internal electrode,
the internal electrode comprises a metallized film, and
the metallized film includes a resin film and a metal layer on at least one main surface of the resin film.

17. The capacitor according to claim 1, wherein the lead terminal is plated with tin, zinc, copper, or nickel.

* * * * *